No. 864,724. PATENTED AUG. 27, 1907.
F. M. BROWN.
FLUID CLUTCH MECHANISM.
APPLICATION FILED FEB. 2, 1906.

2 SHEETS—SHEET 1.

Witnesses:
Edwin T. Luce
Henry U. Pratt

Inventor:
Frederick M. Brown
by Joseph A. Harris
Atty.

No. 864,724. PATENTED AUG. 27, 1907.
F. M. BROWN.
FLUID CLUTCH MECHANISM.
APPLICATION FILED FEB. 2, 1906.

2 SHEETS—SHEET 2.

Witnesses:
Edwin T Luce
Henry M Pratt

Inventor:
Frederick M Brown
by Joseph A Harris Atty.

UNITED STATES PATENT OFFICE.

FREDERICK M. BROWN, OF WARREN, RHODE ISLAND, ASSIGNOR OF TWO-THIRDS TO ISABEL F. HARRIS, OF PROVIDENCE, RHODE ISLAND.

FLUID CLUTCH MECHANISM.

No. 864,724.　　　　　Specification of Letters Patent.　　　　　Patented Aug. 27, 1907.

Application filed February 2, 1906. Serial No. 299,224.

*To all whom it may concern:*

Be it known that I, FREDERICK M. BROWN, of Warren, in the county of Bristol and State of Rhode Island, have invented certain new and useful Improvements in Fluid Clutch Mechanism, of which the following is a specification.

This invention relates to a fluid clutch mechanism, and has for its object the production of a device whereby various speeds may be obtained, ranging from the speed attained by the prime mover, to the slowest possible speed by means of a resistance to the escape of a fluid, said resistance means being at all times under the immediate control of the operator.

The invention consists moreover in certain novel features of construction and arrangement of parts which will be readily understood by reference to the description of the drawings and to the claims to be hereinafter given.

Figure 1:
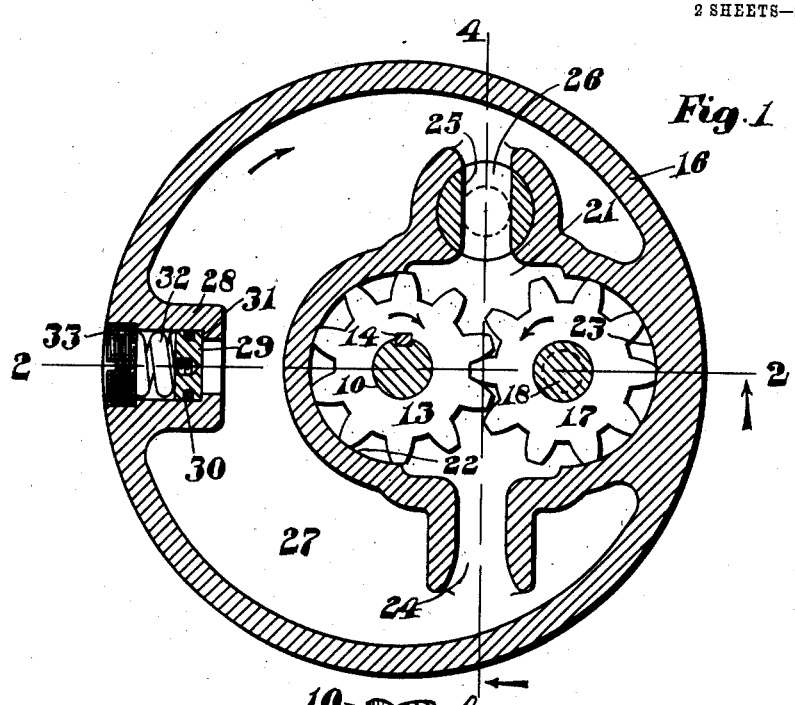
Figure 2:
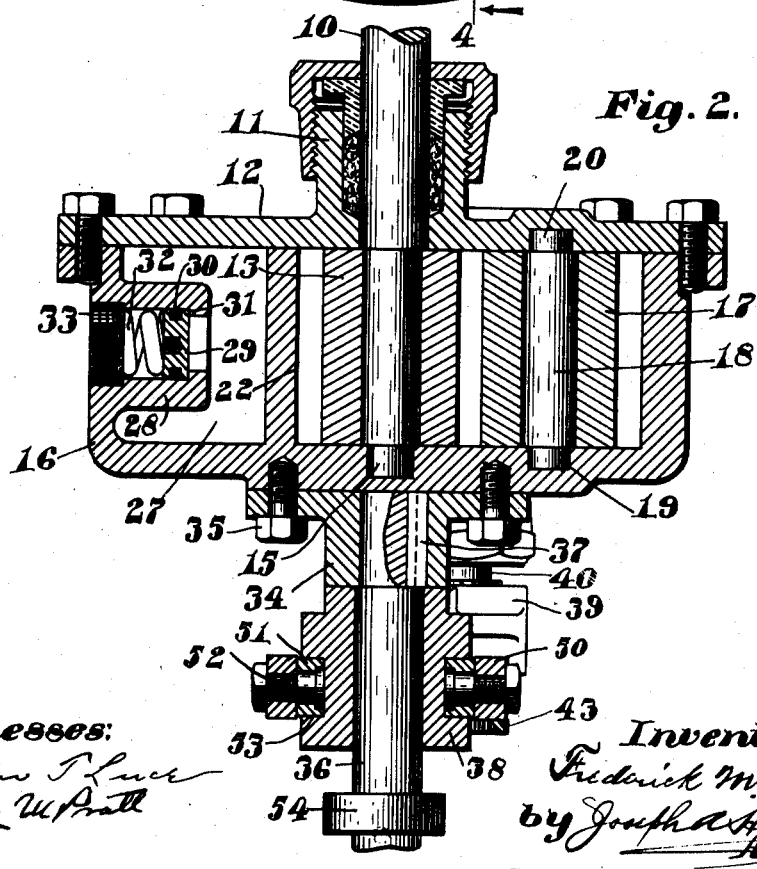
Figure 4:
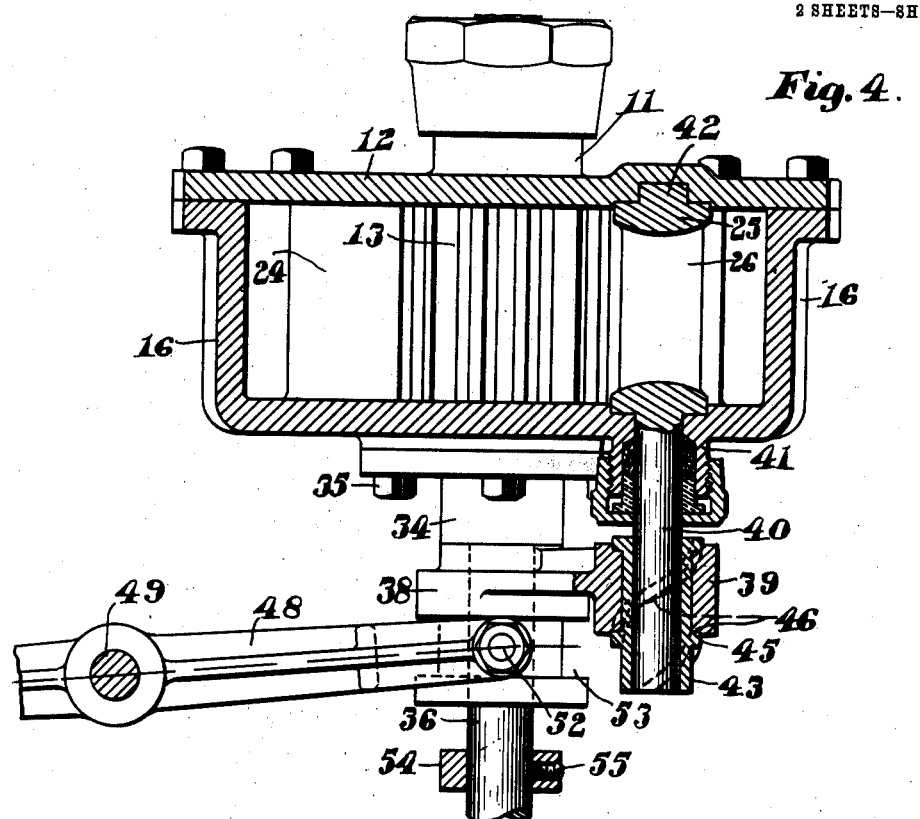
Figure 3:
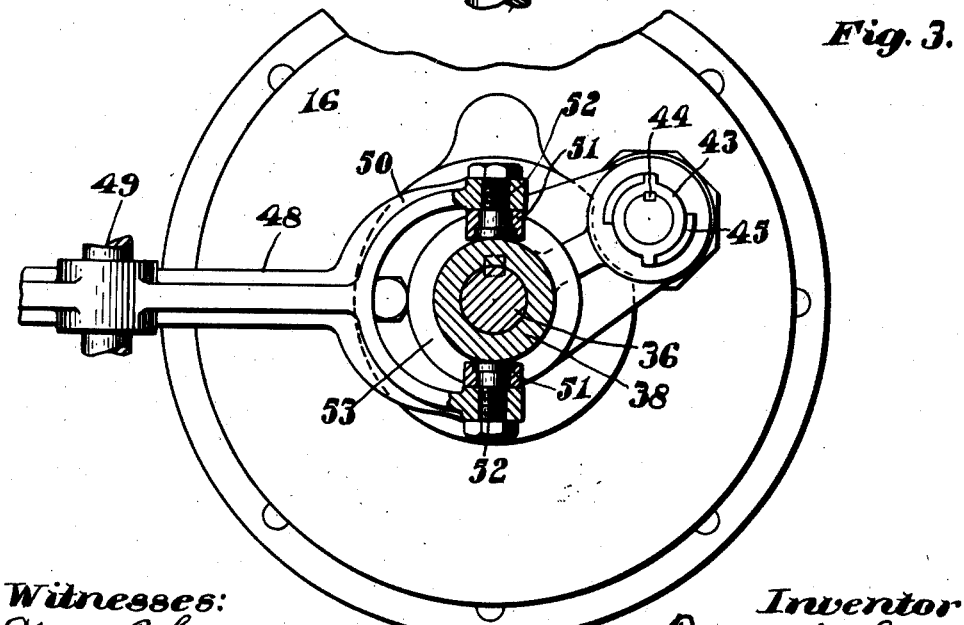

In the drawings: Figure 1 represents a sectional plan, the cutting plane being just below the cover of the casing. Fig. 2 represents a vertical section on line 2—2 of Fig. 1 looking in the direction of the arrow. Fig. 3 represents a bottom plan of the device partly in section, and Fig. 4 represents a vertical section on line 4—4 of Fig. 1 looking in the direction of the arrow.

Similar characters designate like parts throughout the several figures of the drawings.

In the drawings, 10 represents an actuator shaft which is suitably connected to and rotated by any prime mover. Said shaft enters and freely turns within a stuffing box 11 in the center of a cover 12 upon the inclosed annular casing 16. Within said casing 16 is a main chamber 27 which may be filled with any suitable non-elastic fluid. Within this main chamber 27 is located some suitable means for inducing a movement of the fluid. This can be accomplished by mounting any suitable member 13 upon a portion of the actuator shaft 10 and securing the same thereto by a key 14 to cause it to rotate with said actuator shaft 10. To secure the proper alinement of the actuator shaft 10 a reduced portion 15 thereof extends beyond the member 13 into a suitable bearing upon the annular casing 16. Co-acting with said member 13 and revoluble therewith by means of the teeth upon the respective diameters is a member 17 freely revoluble upon a shaft 18, said shaft having reduced end portions 19—20 extending into bearings within the cover 12 and casing 16.

The teeth on the revoluble members 13—17 rotate against the curved faces 22—23 of the chamber 21 in that portion of the casing extending into the main chamber 27. In order to provide a means for conducting the fluid to be acted upon by the revoluble members 13—17 to the chamber 21 there is provided a passage 24 extending from near the inner periphery of the member 16 to at all times insure the entrance of the fluid to the chamber 21 while said fluid is under the action of centrifugal force. The fluid acted upon by the revoluble members 13—17 is impelled through an opening 26 within a valve 25 and projected against the inner periphery of the casing 16.

It will be seen that if the member 13 is rotated in the direction of the arrow as shown in Fig. 1 by means of the actuator shaft 10 the movement is communicated by means of the teeth upon the periphery of said members 13—17 to the member 17, driving said member 17 in the direction as shown by the arrow, thus drawing a quantity of the fluid through the passage 24 in one side of the chamber 21, and from there it is carried around between the teeth of the members 13—17 against their respective walls 22—23 and delivered into the opposite side of the chamber 21 and forcing the same through the passage 26 within the valve 25 and projecting it against the inner periphery of the annular casing 16.

It will be seen that if the fluid is permitted to freely pass from the chamber 27 to the chamber 21 and back to 27 there will be no movement of the casing 16 about the actuator shaft 10, but if the valve 25 be partially closed the movement of the fluid would be obstructed, and the member 17 not being able to rotate as rapidly as the member 13 would begin to carry its own axis of rotation about the axis of rotation of the member 13, carrying said casing 16 in the direction as shown by the arrow. This movement of the casing 16 is communicated to the actuated shaft 36 by means of a key 37 securing said shaft 36 to the member 34 which is secured to the casing by bolts 35. As herein shown the valve 25 is rotated on its trunnion 42 extending within a bearing in the cover 12 by means of a shaft 40 integral with said valve 25, said shaft extending through a stuffing box 41 upon the casing 16 and being freely revoluble therein. The shaft 40 has mounted thereon a member 43 having upon its surface a spiral thread 45. Said member 43 is secured to said shaft 40 to cause it to rotate with said shaft by means of a key 44. To cause the member 43 to rotate there is mounted upon the actuated member 36 a slidable member 38 abutting against the member 34 and having an extension 39, said extension surrounding the member 43 and having a spiral recess 46 which co-acts with the spiral 45 upon the member 43.

By this construction it will be seen that a movement of the member 38 parallel to the axis of the member 36 will cause the member 43 by reason of the spiral 45, to rotate within the extension 39 of said member 38 and turning the valve 25 upon its axis and at the same time allow said valve and actuating means to rotate about the axis of the member 36. The movement of the member 38 parallel to the axis of the member 36 is limited by any suitable means and is herein shown to be thus limited by a collar 54 which surrounds the actuated member 36, and is adjusted along its length by a set screw 55.

To accomplish a movement of the member 38 any suitable means such as a lever 48 is provided, this lever being pivoted at 49 to any stationary foundation and moved by any suitable means attached to said lever 48. This lever 48 has a forked end 50 provided with a revoluble member 51 upon each of the studs 52 which are mounted in said forked end, said revoluble members entering a circumferential groove 53 of the member 38, and when the lever 48 is moved it will cause said member 38 to slide longitudinally upon the rotated member 36.

In order to fill the chambers 21—27 there is projecting within the chamber 27 and upon the casing 16 a boss 28 having a filling orifice. This orifice after the introduction of the fluid to the chambers 21—27 is closed by means of a piston 29, the same having a radial movement within the boss, said movement being limited by the stop face 31 and the spring 32. The spring is backed by a screw plug 33 within the casing 16. To prevent any fluid from leaking past the piston 29, said piston has within a circumferential groove, a packing 30. The movement of the piston 29 is controlled by the amount of fluid contained within the chambers 21—27.

When the outer casing and its internal chamber are completely filled with the liquid the pressure forces the plunger 29 outwardly so that the spring 32 is very nearly compressed, and as the amount of fluid becomes less by reason of its possible leaking through the gland or stuffing box 11, the spring 32 causes the piston 29 to follow up the recession of the liquid and eject what little fluid there is within the boss 28 into the main chamber 27, thus causing the chambers 21—27 to remain at all times completely filled, and also maintain the liquid at a uniform pressure. This is an important feature of the invention and adds materially to the efficiency and operativeness of the device, and effectually maintains a constant uniform pressure within the casing and its chamber.

The operation of the invention is as follows: The actuator shaft 10 is rotated by any prime mover as herein set forth, the normal position of the valve 25 remaining open, thus allowing an unimpeded circulation of the fluid from the main chamber 27 to the chamber 21 and back to the chamber 27 again. To start the rotation of the rotated member 36, the lever 48 is moved, by any suitable means about its pivot 49, thereby causing the member 38 to be moved longitudinally of said member 36 by means of the members 51 upon the free ends of the forked portion 50 of the member 48 engaging with the circumferential groove of said member 38. This movement will cause said member 38 to leave the stop face of the member 34 and move toward the stop 54 to the desired position. This position is predetermined by the operator and corresponds with the speed required. This movement of the member 38 causes the member 43, with its spiral thread 45 engaging the spiral recess 46 within the member 39, to rotate the shaft 40 about its axis, partially or wholly closing the valve 25, as the case may be. This closing of the valve 25 impedes the flow of fluid through the passage 26 from the chamber 21, and as a result the member 17 upon the shaft 18 will not rotate by reason of this obstruction as rapidly as the member 13 which is driven by the actuator shaft, thus causing the member 17 to travel by reason of its decreased speed around the axis of the member 13 in a direction as shown by the arrow on the member 16. The member 17 by reason of its being retained upon the shaft 18 and freely revoluble thereon, carries with it, in its movement around the axis of the member 13, the casing 16 in the same direction as that of the member 13 as shown by the arrow on Fig. 1, also causing the member 34 which is secured to the member 16 by means of the bolts 35 and the rotated member 36, to rotate in unison with said casing. From this description it will be seen that the relative speed of the casing 16 and the member 36 is wholly controlled by the amount of obstruction to the passage of the fluid from the chamber 21 to the chamber 27.

It is believed that with the foregoing description the operation of the invention will be thoroughly understood.

I claim as new and desire to secure by Letters Patent the following claims:

1. A fluid clutch mechanism comprising an outer casing, an inner casing arranged within said outer casing and forming an inner chamber at one side of the center of the outer casing and having inlet and outlet passages communicating with said inner chamber through its opposite sides, a drive shaft extending through said outer casing and inner casing, an idler shaft journaled within said casing and spaced from the drive shaft, intermeshing gears carried by said shafts within said inner casing with their interengaging teeth in alinement between said inlet and outlet passages, a valve arranged in said outlet passage and operating to regulate the flow of liquid through the inner chamber, and means for actuating said valve.

2. A fluid clutch mechanism comprising an outer casing, an inner casing arranged within said outer casing and forming a substantially elliptical inner chamber at one side of the center of the outer casing and concentric therewith at one end, said inner chamber having inlet and outlet passages communicating with said inner chamber through its longer sides, a drive shaft extending through said outer casing and inner casing concentric with one end of the inner casing, an idler shaft journaled within said inner casing and concentric with the other end of the same, intermeshing gears carried by said shafts within said inner casing with their inter-engaging teeth in alinement between said inlet and outlet passages, a valve arranged in said outlet passage and operating to regulate the flow of liquid through the inner casing, and means for actuating said valve.

3. A fluid clutch mechanism comprising an outer casing, an inner casing arranged within said outer casing and forming a substantially elliptical inner chamber at one side of the center of the outer casing and concentric therewith at one end, said inner chamber having inlet and outlet passages communicating with said inner chamber through its longer sides, a drive shaft extending through said outer casing and inner casing and concentric with the outer casing and likewise concentric with one end of the inner casing, an idler shaft journaled within said inner casing and concentric with the other end of the same, intermeshing gears carried by said shafts within said inner casing with their interengaging teeth in alinement between said inlet and outlet passages, a valve arranged in said inlet passage and operating to regulate the flow of liquid through the inner chamber, said valve having a stem extending through the outer casing and provided with a spiral thread, a collar having an internal spiral thread and engaging the spiral thread of said stem, a stud extending from said casing in alinement with said drive shaft, a sleeve slidable upon said stud and having an arm connected to said spirally threaded collar, and means for actuating said sleeve to cause the operation of said valve.

4. A fluid clutch mechanism comprising an outer casing, an inner casing arranged within said outer casing and forming an inner chamber at one side of the center of the outer casing and having inlet and outlet passages communicating with said inner chamber through its opposite sides, a drive shaft extending through said outer casing and inner casing, an idler shaft journaled within said inner casing and spaced from the drive shaft, intermeshing gears carried by said shafts within said inner casing with their inter-engaging teeth in alinement between said inlet and outlet passages, a valve arranged in said outlet passage and operating to regulate the flow of liquid through the inner chamber, and means for actuating said valve.

In testimony whereof I have affixed my signature, in presence of two witnesses.

FREDERICK M. BROWN.

Witnesses:
JAMES W. COOK,
EVERETT C. WINSLOW.